(12) United States Patent
Barreiro et al.

(10) Patent No.: US 12,070,688 B2
(45) Date of Patent: Aug. 27, 2024

(54) APPARATUS AND METHOD FOR AUDIO DATA ANALYSIS

(71) Applicant: Sony Interactive Entertainment Inc., Tokyo (JP)

(72) Inventors: Marina Villanueva Barreiro, Acoruña (ES); Michael Lee Jones, London (GB); Oliver Hume, London (GB); Fabio Cappello, London (GB); Danjeli Schembri, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 337 days.

(21) Appl. No.: 17/498,947

(22) Filed: Oct. 12, 2021

(65) Prior Publication Data

US 2022/0111294 A1    Apr. 14, 2022

(30) Foreign Application Priority Data

Oct. 14, 2020 (GB) .................................... 2016305

(51) Int. Cl.
| | |
|---|---|
| *A63F 13/54* | (2014.01) |
| *G06F 40/20* | (2020.01) |
| *G10L 15/16* | (2006.01) |
| *G10L 15/22* | (2006.01) |
| *G10L 25/30* | (2013.01) |
| *G10L 25/60* | (2013.01) |

(52) U.S. Cl.
CPC .............. *A63F 13/54* (2014.09); *G06F 40/20* (2020.01); *G10L 15/16* (2013.01); *G10L 15/22* (2013.01); *G10L 25/30* (2013.01); *G10L 25/60* (2013.01)

(58) Field of Classification Search
None
See application file for complete search history.

(56) References Cited

U.S. PATENT DOCUMENTS

| | | | |
|---|---|---|---|
| 2004/0006483 A1* | 1/2004 | Sasaki | G10L 15/22 704/E15.04 |
| 2011/0106531 A1 | 5/2011 | Liu | |

(Continued)

FOREIGN PATENT DOCUMENTS

| | | | |
|---|---|---|---|
| EP | 3734595 A1 | 11/2020 | |
| WO | 2019233358 A1 | 12/2019 | |
| WO | WO2019233358 | * 12/2019 | ............... G06N 3/04 |

OTHER PUBLICATIONS

Extended European Search Report for corresponding EP Application No. 21199947.9, 10 pages, dated Mar. 11, 2022.

(Continued)

*Primary Examiner* — Jason T Yen
(74) *Attorney, Agent, or Firm* — Matthew B. Dernier, Esq.

(57) ABSTRACT

A data processing apparatus includes input circuitry to receive audio data for a plurality of respective dialogue recordings for a video game, classification circuitry comprising one or more machine learning models to receive at least a portion of the audio data for each dialogue recording and trained to output classification data indicative of a quality classification of a dialogue recording in dependence upon one or more properties of the audio data for the dialogue recording, and storage circuitry to store identification data for one or more of the plurality of dialogue recordings in dependence upon the classification data.

13 Claims, 4 Drawing Sheets

(56) References Cited

U.S. PATENT DOCUMENTS

| | | |
|---|---|---|
| 2015/0073785 A1 | 3/2015 | Sharma |
| 2015/0142420 A1* | 5/2015 | Sarikaya ............. G10L 15/1815 |
| | | 704/9 |
| 2020/0251115 A1* | 8/2020 | Farinelli ................ G06N 3/044 |
| 2021/0264938 A1 | 8/2021 | Yao |

OTHER PUBLICATIONS

Militani Davis, et al., "A Speech Quality Classifier based on Signal Information that Considers Wired and Wireless Degradations," International Conference on Software Communications and Computer Networks (Softcom) 6 pages, Sep. 19, 2019.

Combined Search Report and Examination Report for corresponding GB Application No. 2016305.1, 6 pages, dated Mar. 9, 2021.

\* cited by examiner

APPARATUS AND METHOD FOR AUDIO DATA ANALYSIS

BACKGROUND OF THE INVENTION

Field of the Disclosure

The present disclosure relates to apparatus and methods for analysing audio data. In particular, the present disclosure relates to data processing apparatus and methods for analysing audio data comprising one or more dialogue recordings.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Dialogue production for a video game typically requires the work of actors, directors and game developers over months or even years to record thousands, and in some cases hundreds of thousands, of lines of dialogue. For the video game Star Wars: The Old Republic®, more than 200,000 lines of recorded dialogue were performed by hundreds of voice actors making it the largest entertainment voice over project at the time. Fallout 4® is another example of a video game having thousands of lines of recorded dialogue.

The number of various scenarios that can possibly arise within a video game means that video games can often require vast amounts of dialogue and this presents particular challenges during the development of a video game. In particular, for some games the amount of recorded dialogue can be of the order of one hundred times longer in duration than the recorded dialogue used for a feature-length motion picture, and the amount of recorded dialogue can thus result in a time consuming quality assurance process during development of a video game.

One challenge for video games having audio recorded over a period of time is that a quality of the audio recordings may vary. Audio may be recorded at different locations at different times, such as at different recording studios, which can result in varying quality of the audio recordings. Different recording studios may use different hardware and have different levels of sound proofing. Therefore during a quality assurance stage, hundreds of hours of a game developer's time can be dedicated to dialogue clean up.

It is in the context of the above arrangements that the presently disclosure arises.

SUMMARY OF THE INVENTION

Various aspects and features of the present invention are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

Embodiments of the invention will now be described, by way of example only, with reference to the accompanying drawings wherein like reference numerals designate identical or corresponding parts throughout the several views, and in which:

FIG. 1 schematically illustrates a data processing apparatus 100 for outputting classification data for a plurality of dialogue recordings for a video game and storing identification data for one or more of the dialogue recordings in dependence upon the classification data. In embodiments of the disclosure, the data processing apparatus 100 comprises input circuitry 110 to receive audio data for a plurality of respective dialogue recordings for a video game, classification circuitry 120 comprising one or more machine learning models 125 to receive at least a portion of the audio data for each dialogue recording and trained to output classification data indicative of a quality classification of a dialogue recording in dependence upon one or more properties of the audio data for the dialogue recording, and storage circuitry 130 to store identification data for one or more of the plurality of dialogue recordings in dependence upon the classification data.

Figure 1:
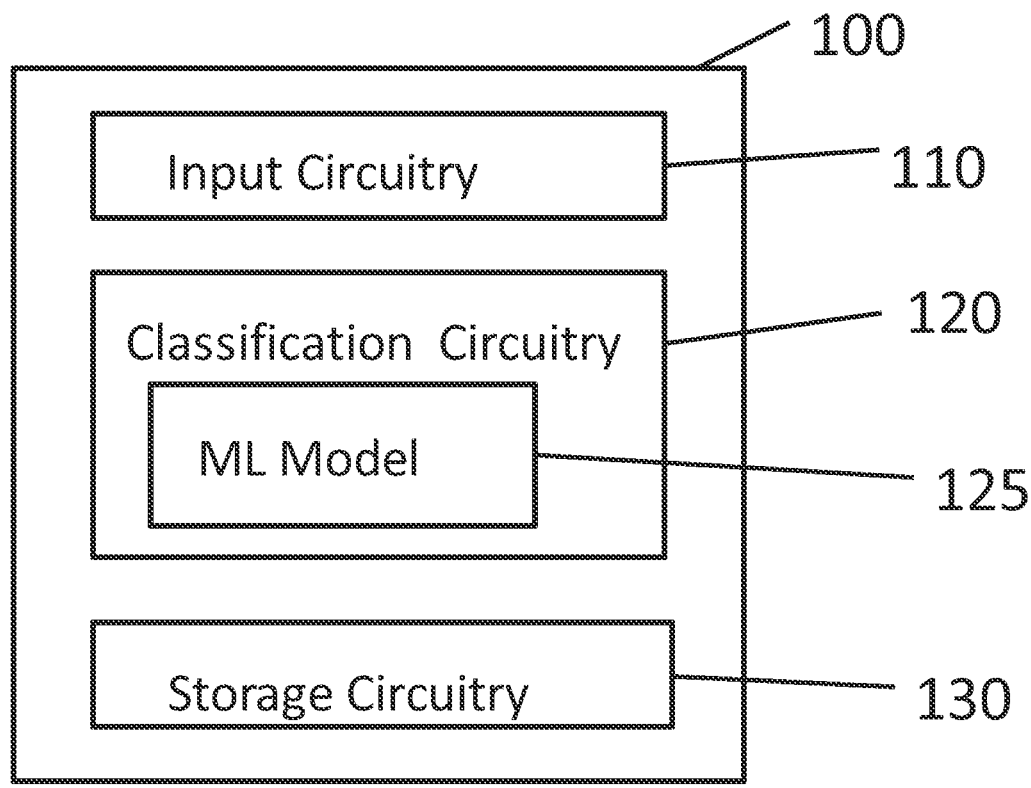
FIG. 1 is a schematic diagram illustrating a data processing apparatus.

The data processing apparatus 100 can receive audio data for a plurality of respective dialogue recordings for a video game. As explained below, the plurality of respective dialogue recordings for the video game may be a subset of the dialogue recordings that have been recorded for the video game, such as a plurality of dialogue recordings corresponding to a same in-game level, a same in-game scene, a same in-game character, or a same voice actor or a same language, or the plurality of respective dialogue recordings for the video game may in some cases be all of the dialogue recordings available for the video game at the current stage of development of the video game. The input circuitry 110 is configured to acquire the audio data for a plurality of dialogue recordings for the same video game and the classification circuitry 120 is configured to output classification data for each of the plurality of dialogue recordings using one or more machine learning models, where the classification data provides an indication of a quality classification for each of the plurality of dialogue recordings. For example, the classification data for a given dialogue recording may be indicative of one of a first quality classification (e.g. high quality classification) and a second quality classification (e.g. low quality classification) such that the data processing apparatus 100 can be used to classify each of the plurality of dialogue recordings.

The classification circuitry 120 comprises one or more machine learning models 125 (ML models) each trained to output classification data for a dialogue recording depending one or more properties of the audio data for the dialogue recording. A first machine learning model can be trained to output first classification data for a dialogue recording in dependence upon one or more first properties of the dialogue recording so as classify the quality of the dialogue recording depending on one or more of the first properties. Similarly, a second machine learning model can be trained to output second classification data for a dialogue recording in dependence upon one or more second properties of the dialogue recording so as classify the quality of the dialogue recording depending so on one or more of the second properties, where the one or more first properties are different from the one or more second properties. Similarly optionally a third machine learning model may be trained on a further property, and so on. Therefore, the classification circuitry 120 comprises at least one machine learning model 125 trained to output classification data indicating a level of quality from a plurality of quality levels for a dialogue recording in dependence upon a property of the audio data for the dialogue recording. This is discussed in more detail later.

On the basis of the classification data associated with each of the plurality of dialogue recordings, the storage circuitry 130 can selectively store identification data for at least some of the plurality of dialogue recordings. The storage circuitry 130 can be configured to store identification data for a dialogue recording in dependence upon a quality classification for the dialogue recording indicated by the classification data for the dialogue recording. As explained later, the storage circuitry 130 can store identification data for each of the dialogue recordings having a quality classification (quality level) that is less than a threshold quality classification (threshold quality level) such that the storage circuitry 130 is used to store identification data for indicating dialogue recordings of low quality for further analysis by a game developer, and/or the storage circuitry 130 can store identification data for each of the dialogue recordings having a quality classification (quality level) that is greater than or equal to a threshold quality classification (threshold quality level) such that the storage circuitry 130 is used to store identification data for indicating dialogue recordings of sufficient quality for use in the video game.

Therefore, the storage circuitry 130 can be used to store identification data for indicating dialogue recordings which are deemed by the classification circuitry 120 not to be of sufficient quality, so that the dialogue recordings indicated by the stored identification information can be subjected to one or more processing operations for quality enhancement (e.g. further processing using a high pass filter) and/or so that the dialogue recordings indicated by the stored identification information can be indicated to a game developer as requiring replacement so that further voice recordings can be recorded for replacing the low quality dialogue recordings. In other words, the storage circuitry 130 can be used to store information for indicating low quality dialogue recordings for which another recording is needed. Alternatively, the storage circuitry 130 can be used to store identification data for dialogue recordings which are deemed by the classification circuitry 120 to be of sufficient quality such that the storage circuitry 130 can be used to store information for indicating dialogue recordings suitable for use in the video game.

In some examples, in addition to storing the identification data for a dialogue recording the storage circuitry 130 can be configured to store at least some of the audio data for the dialogue recording. Therefore, in some cases the storage circuitry 130 may also store at least a portion of the audio data for a dialogue recording so that the audio data can be directly accessed from the storage circuitry 130 by a game developer for further analysis. In the case described above where just the identification data is stored for a dialogue recording, the identification data allows the audio data for the dialogue recording to be accessed from a storage device (e.g. a database) that stores the audio data for the dialogue recordings for the video game. For example, the identification data may take the form of an identification number, or a name or a memory address for the audio data for a dialogue recording. The identification data can be any data suitable for allowing the audio data for the dialog recording to be accessed and obtained from a storage medium or for indicating to a developer an identity of the dialogue recording.

In some cases, the storage circuitry 130 can be configured to store identification data for each of the plurality of dialogue recordings for which audio data is received by the input circuitry 110, where the identification data for each dialogue recording is stored in association with the classification data output by one or more of the machine learning models 125 for that dialogue recording. Therefore, for a given in-game scene or in-game level for example, the storage circuitry 130 can store identification data for each of the received dialogue recordings, where the identification data for each received dialogue recording is stored in association with the classification data output for that dialogue recording. In this way, the dialogue recordings for a given portion of the video game can be indicated and the classification data provides an indication of a number of the dialogue recordings that are of low quality classification and a number of the dialogue recordings that are of high quality classification so as to provide an indication of an overall quality of the dialogue recordings for the given portion of the video game. This may be particularly advantageous for identifying portions of the video game for which the overall quality of the dialogue recordings is relatively low so that a developer can focus their efforts more towards these portions of the video game. For example, for a given portion of the video game, the input circuitry 110 may acquire N respective dialogue recordings, the storage circuitry 130 can store identification data for the N respective dialogue recordings, and the classification data for each of the N respective dialogue recordings can provide an indication of a number of the dialogue recordings that have a low quality classification and a number of the dialogue recordings that have a high quality classification. Therefore, a proportion of the dialogue recordings for a given portion of the video game that are low quality can be indicated and portions of the video game having a high proportion of low quality dialogue recordings can be identified and therefore targeted for improvement by a game developer. The classification data output for a given dialogue recording is indicative of a quality classification from a plurality of quality classifications, such that the classification data associated with a given dialogue recording indicates a quality level for the given dialogue recording from a plurality of quality levels. As such, whilst the above example has been described with reference to high quality and low quality classifications, it will be appreciated that in some cases the plurality of classifications may comprise more than two quality classifications (e.g. low quality, intermediate quality, high quality). The number of classifications is not particularly limited.

Figure 2:
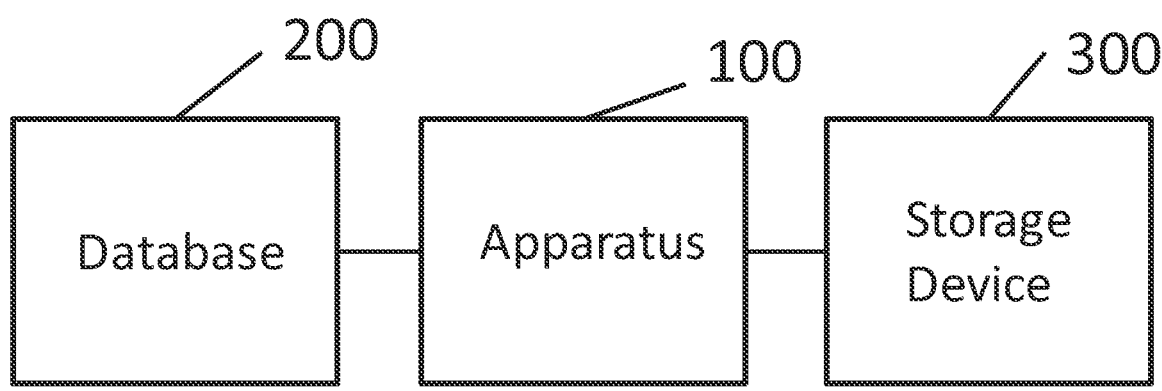
FIG. 2 is a schematic diagram illustrating a system comprising a data processing apparatus and a database for storing audio data for a video game.

FIG. 2 schematically illustrates an example of a system comprising the data processing apparatus 100, a database 200 that stores the audio data for a plurality of respective dialogue recordings and a storage medium 300. During development of a video game, one or more databases 200 can be used to store audio recordings for the video game, including respective dialogue recordings for the video game. The database 200 may in some cases store audio data for each of the dialogue recordings for the video game. Alternatively, the database 200 may store audio data for each of the dialogue recordings for a given portion of the video game, where a given portion may be a portion defined by a predetermined start time and a predetermined end time set by a user (developer). In some cases, the database 200 may store audio data for each of the dialogue recordings for a given portion of the video game, where a given portion may be a given scene or a given in-game level for the video game. The database 200 can be configured to store the audio data for a dialogue recording using any suitable digital audio file format. For example, the audio data for a dialogue recording may be stored using a waveform audio file format standard (WAV), or MPEG-4 or MPEG-3 audio file format. The input circuitry 110 is configured to acquire at least a portion of the audio data for a respective dialogue recording. For example, for a given dialogue recording having a duration of 10 seconds, the input circuitry 110 can be configured to acquire the audio data for a 1 second segment so that a classification for the quality level of the dialogue recording can be obtained on the basis of the 1 second segment. In some cases the classification circuitry 120 is configured to output classification data for a dialogue recording according to one or more speech properties in which case the input circuitry can be configured to acquire all of the audio data for the dialogue recording so that a classification for the quality level of the dialogue recording is obtained by analysing the whole dialogue recording.

The database 200 may be provided as part of a remote server in which case the input circuitry 110 can be configured to communicate with the sever via a wireless communication to receive the audio data. Alternatively, the database 200 may be provided as part of a local storage (e.g. hard-drive) and the input circuitry 110 can be configured to communicate with the local storage via a wired or wireless communication (e.g. Wi-Fi® or Bluetooth® wireless link) to receive the audio data. In some examples, the database 200 may be provided as part of the data processing apparatus 100. Hence more generally, the input circuitry 110 can be configured to access the database 200 to receive at least some of the audio data for a plurality of the dialogue recordings stored in the database 200. The data processing apparatus 100 can therefore access the audio data stored by the database 200 for one or more dialogue recordings and, depending on the classification data output for the audio data identification, the storage circuitry 130 can store identification information for a dialogue recording. The storage circuitry 130 can be provided as part of the data processing apparatus 100 as shown in FIG. 1, or provided separate to the data processing apparatus 100 as a storage device 300 (as shown in FIG. 2), or in some cases the storage circuitry 130 may be distributed so that at least a part of the storage circuitry 130 is provided as part of the of the data processing apparatus 100 and at least a part of the storage circuitry 130 is provided as part of an external storage device, such as the storage device 300. In some examples, the storage circuitry 130 may comprise a first memory region provided as part of the data processing apparatus 100 and a second memory region provided as part of an external storage device, in which the first memory region is configured to store identification data for one or more dialogue recordings having a quality classification (quality level) that is less than the threshold quality classification (threshold quality level) such that the first memory is used to store identification data for indicating dialogue recordings of low quality for further analysis by a game developer, and in which the second memory region is configured to store identification data for one or more dialogue recordings having a quality classification (quality level) that is greater than or equal to the threshold quality classification (threshold quality level) such that the second memory region is used to store identification data for indicating dialogue recordings of sufficient quality for use in the video game. In this way, the data processing apparatus 100 can effectively received audio data for a plurality of dialogue recording and store identification data for each dialogue recording in one of the first and second memory portions to provide a repository for suitable dialogue recording and another repository for unsuitable dialogue recordings.

In some examples, the input circuitry 110 can be configured to receive audio data for each of the plurality of dialogue recordings stored in the database 200, where each of the plurality of dialogue recordings corresponds to a same portion of the video game. In some examples, the input circuitry 110 can be configured to select the plurality of dialogue recordings stored by the database 200 according to a user input. The user input may indicate a given in-game level or in-game scene and the input circuitry can be configured to select a plurality of dialogue recordings corresponding to the in-game level or in-game scene and to acquire the audio data for the selected dialogue recordings. For example, each dialogue recording may be stored in association with data indicative of an in-game level and/or an in-game scene associated with the dialogue recording such that in response to the user input indicating an in-game level or in-game scene, the input circuitry can select the dialogue recordings having associated data corresponding to the same in-game level or in-game scene.

In embodiments of the disclosure, the one or more machine learning models 125 comprise a first machine learning model trained to output first classification data indicative of an audio noise quality classification of the dialogue recording in dependence upon one or more first properties of the audio data for the dialogue recording. The first machine learning model is configured to receive at least a portion of the audio data for a dialogue recording and to output the first classification data for the dialogue recording, where the first classification data is indicative of an audio noise quality classification for the dialogue recording. In a simplest case, the first machine learning model is configured to output the first classification data for a dialogue recording indicating one of a first classification and a second classification, where the first classification is a high quality classification (low level of audio noise present in the audio data for the dialogue recording) and the second classification is a low quality classification (high level of audio noise present in the audio data for the dialogue recording). As explained previously, the first classification data may be indicative of one classification from a plurality of classifications where the number of classification is not particularly limited. For example, the first classification data may be indicative of one classification from ten possible classifications, such that there are ten respective classifications for the audio noise quality level of a dialogue recording.

In embodiments of the disclosure, the first machine learning model is trained to output the first classification data in dependence upon one or more of the first properties of the audio data for the dialogue recording, wherein the one or more first properties of the audio data for the dialogue recording comprise one or more from the list consisting of: a magnitude of a noise floor for the dialogue recording; a magnitude of signal to noise ratio for the dialogue recording; and an amplitude of an audio signal for the dialogue recording. The first machine learning model is trained to receive at least a portion of the audio data for a dialogue recording and to output classification data for the dialogue recording depending on one or more properties associated with the noise floor of the audio data, where the noise floor is a sum of all the noise sources and unwanted signals within a measurement system used to record a dialogue recording. The noise floor represents the level of background noise in a recording when no speech (narration) is recorded. Depending on variations in the hardware used for recording an actor's voice, such as variations in the quality of the microphones, preamps and/or connections, some dialogue recordings may have a noise floor that is smaller or greater in magnitude than others. The magnitude of the noise floor for a system represents a smallest magnitude signal that can be measured by the system.

Some of the dialogue recordings used for a given video game may be recorded during an initial shoot and other dialogue recordings for the video game may have been recorder during a later shoot. For example, as a video game evolves during the course of its production, a game developer may revise portions of the game, including level design, character rosters, and sequences of events such that new dialogue recordings may need to be subsequently shot and the content of certain dialogue recordings may need to be altered. Therefore, for a given in-game scene or level, there may be a mismatch in quality of the audio data for the respective dialogue recordings due to the different environmental conditions at the time of the recording, such as a mismatch in the noise floor of the recordings and/or a mismatch in the signal to noise ratio.

The first machine learning model can be trained to output the first classification data indicating an audio noise quality classification from a plurality of audio noise quality classifications in dependence upon a magnitude of a noise floor for a dialogue recording. The first machine learning model is trained to output the first classification data depending on the magnitude of the noise floor for at least a portion of the audio data for a dialogue recording, where the first classification data is indicative of one of a first classification and a second classification, where the first classification is a high quality classification for audio data having a small magnitude for the noise floor and the second classification is a low quality classification for audio data having a large magnitude for the noise floor. As explained previously, the first classification data is indicative of one classification from a plurality of classifications where the number of classification is not particularly limited. Therefore, the first machine learning model can classify a dialogue recording according to a magnitude of the noise floor for the dialogue recording. The first machine learning model can be trained to output the first classification data in dependence upon a maximum magnitude of the noise floor, a minimum magnitude of the noise floor or an average (e.g. mean, mode or median) magnitude of the noise floor for a given period of time. Alternatively or in addition, the first machine learning model can be trained to output the first classification data in dependence upon a magnitude of a signal to noise ratio for at least some of the audio data for the dialogue recording. The first machine learning model can be trained to output the first classification data depending on a ratio of the signal power to the noise power of the noise floor such that a dialogue recording having a larger signal to noise ratio is classified by the first machine learning model as a high quality dialogue recording and a dialogue recording having a smaller signal to noise ratio is classified by the first machine learning model as a low quality dialogue recording.

Therefore, the first classification data for a dialogue recording provides an indication of an audio noise quality classification for the dialogue recording in dependence upon one or more properties for the noise floor associated with the dialogue recording, where the first classification data is indicative of one classification from a plurality of classifications and each classification for the first classification data has an associated audio noise quality level. For example, for the first classification data, a first classification may be associated with a highest audio noise quality level, a second classification may be associated with a second highest audio noise quality level and so on and an Nth classification may be associated with a lowest audio noise quality level.

In embodiments of the disclosure, the storage circuitry 130 is configured to store the identification data for one or more of the plurality of dialogue recordings for which the first classification data is indicative of an audio noise quality classification having an audio noise quality level that is less than a threshold audio noise quality level for the first classification data. In a simplest case, the first classification data may indicate that a first dialogue recording has a first classification and also indicate that a second dialogue recording has a second classification, where the first classification corresponds to high quality and the second classification corresponds to low quality. In this case, the storage circuitry 130 can be configured to compare the first classification data for each dialogue recording with a threshold audio noise quality level and to store one or more dialogue recordings for which the first classification data is indicative of an audio noise quality level that is less than the threshold audio noise quality level. In particular, the threshold audio noise quality level can be set to be the same as the audio noise quality level for the first classification for the first classification data. In this way, identification information for any dialogue recording having the second classification for the first classification data can be stored by the storage circuitry 130 so as to allow low quality dialogue recordings to be identified. Optionally, the storage circuitry 130 may also store at least some of the audio data for the low quality dialogue in addition to the identification information, as discussed previously. Therefore, the storage circuitry 130 can be configured to store information for identifying dialogue recordings not of sufficient audio noise quality for the video game. As such, a game developer can either be informed of dialogue recordings which need to be re-taken. Alternatively, in some examples, the data processing apparatus 100 may further comprise filtering circuitry (not shown in FIG. 2) to process the audio data for a dialogue recording using a high pass filter.

Figure 3:
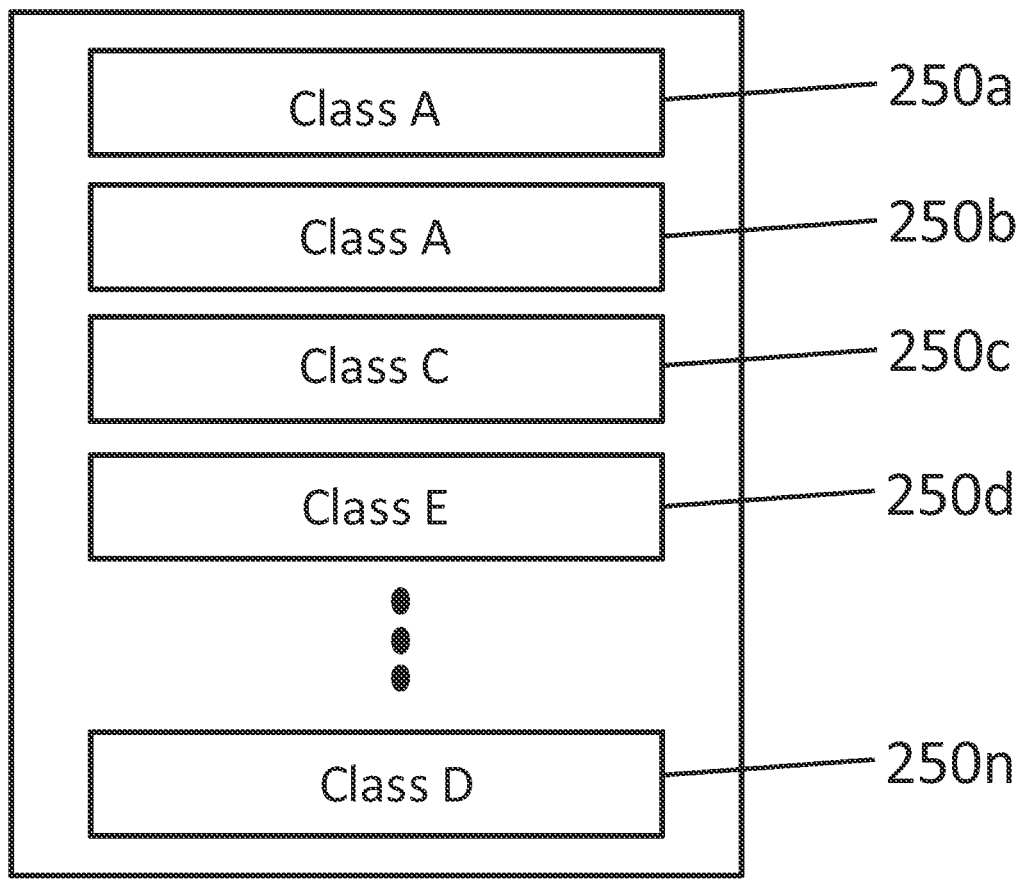
FIG. 3 is a schematic diagram illustrating an example of first classification data output by a first machine learning model.

Whilst the above example has been described with reference to first classification data indicating one of a first classification and a second classification, the number of possible classifications for the first classification data is not particularly limited. For example, the first machine learning model can be configured to classify a give dialogue recording using a classification from N possible classifications, where for the example below N is 5, but N could be any value greater than or equal to 2. FIG. 3 schematically illustrates an example of the first classification data output by the first machine learning model for the dialogue recordings 250a, 250b, 250c, 250d . . . 250n. In the example shown, the dialogue recordings are classified using 5 possible classifications A, B, C, D and E, where class A represent the highest quality class and class E represents the lowest quality class. The storage circuitry 130 can be configured to store identification data for a dialogue recording according to whether the classification for the dialogue recording has a quality level that is less than a threshold level, where the threshold level can be freely set to correspond to a quality level of any of the classifications A, B, C D or E. The threshold level can be set by default or can be set by a game developer. For example, the threshold level can be set to a threshold audio noise quality level associated with the class C so that the storage circuitry 130 stores identification information (and optionally audio data) for each dialogue recording having classification D or classification E, such that in the example shown the identification information is stored for the dialogue recordings 250d and 250n and not for the other dialogue recordings. It will be appreciated that the threshold audio noise quality level can be set to correspond to any one of the classes A to D in the example shown. For example, depending on the requirements of a game developer, the game developer may set the threshold audio noise quality level to correspond to the class A so that identification information is stored for dialogue recordings having the classes B to E. Hence more generally, identification information can be stored for dialogue recordings that are not of sufficient quality for the video game to assist a game developer in at least identifying these dialogue recordings. Therefore, retakes can be performed for some or all of the identified dialogue recordings and/or a de-noising tool (e.g. low pass filter) may be used to reduce the level of noise present in the audio for some or all of the identified dialogue recordings.

In embodiments of the disclosure, the storage circuitry 130 is configured to store the first classification data for a dialogue recording in association with the identification information for the dialogue recording. In this way, in addition to storing information for identifying the dialogue recording a game developer can also be informed of a quality classification for the dialogue recording. Therefore, in the case described above where there are N possible classifications, the game developer can be informed of a relative level of the quality of a dialogue recording so that dialogue recordings deemed to have the lowest quality classification can be preferentially targeted for improvement or replacement.

In embodiments of the disclosure, the one or more machine learning models 125 comprise a second machine learning model trained to output second classification data indicative of a speech quality classification of the dialogue recording in dependence upon one or more second properties of the audio data for the dialogue recording. The second machine learning model is configured to receive at least a portion of the audio data for a dialogue recording and to output the second classification data for the dialogue recording, where the second classification data is indicative of a speech quality classification for the dialogue recording. In a simplest case, the second machine learning model is configured to output the second classification data for a dialogue recording indicating one of a first classification and a second classification, where the first classification is a high quality classification (high level of speech quality) and the second classification is a low quality classification (low level of speech quality). The second classification data is indicative of one classification from a plurality of classifications where the number of classification is not particularly limited. For example, the second classification data may be indicative of one classification from ten possible classifications, such that there are ten respective classifications for the speech quality of a dialogue recording. The number of respective classifications used for the second classification data may be the same as the number of respective classifications used for the first classification data, or different numbers of respective classifications may be used.

In embodiments of the disclosure, the second machine learning model is trained to output the second classification data in dependence upon one or more of the second properties of the audio data for the dialogue recording, wherein the one or more second properties of the audio data for the dialogue recording comprise one or more from the list consisting of: a duration of non-speech sounds for the dialogue recording; a number of respective non-speech sounds for the dialogue recording; an amplitude of one or more non-speech sounds for the dialogue recording; a number of respective words per unit time for the dialogue recording; and a number of respective plosive sounds for the dialogue recording.

The second machine learning model is trained to receive at least a portion of the audio data for a dialogue recording and to output classification data for the dialogue recording depending on one or more properties associated with the sounds included in the audio data, where the sounds include one or more speech sounds (voice sounds) and one or more non-speech sounds (non-voice sounds). Whilst recording an actor's voice, a microphone can detect speech sounds and non-speech sounds, where speech sounds are those associated with the actor and non-speech sounds are those having a magnitude that is greater than the noise floor so as to be audible and associated with other aspects in the environment other than the actors voice. In the following, non-speech sounds include any sounds other than the voice sounds of the actor being recorded. Non-speech sounds include background sounds which may arise due to physical movement of the actor or other people or one or more objects in the room used for recording, and wind sounds that are picked up by a microphone. In addition, the speech sounds may comprise one or more plosive sounds. When an actor pronounces certain consonants, particularly a strong p, t, k, f or b sound, this can cause a air to be directed towards the microphone for which the resulting air pressure change causes a detection of a plosive sound by the microphone, where plosive sounds are audible as a wind sound or a popping sound. Typically a microphone may be provided with a pop shield or windshield to reduce detection of wind and popping sounds but plosive sounds can still often be audible in a dialogue recording. For instance, in a recording environment some actors may positon themselves too close a microphone which can significantly increase the loudness and the number of plosive sounds detected by the microphone.

The second machine learning model can be trained to output the second classification data indicating a speech quality classification from a plurality of speech quality classifications in dependence upon a duration of non-speech sounds for at least a portion of the audio data for a dialogue recording. The second machine learning model can be trained to detect one or more non-speech sounds present in the portion of the audio data for the dialogue recording and to output the second classification data in dependence upon the duration of the non-speech sounds, where a non-speech sound has an amplitude exceeding the noise floor and does not correspond to a speech sound. Alternatively or in addition, the second machine learning model can be trained to detect one or more non-speech sounds present in the portion of the audio data for the dialogue recording and to output the second classification data in dependence upon a number of respective non-speech sounds present in the portion of the audio data. Alternatively or in addition, the second machine learning model can be trained to detect one or more non-speech sounds present in the portion of the audio data for the dialogue recording and to output the second classification data in dependence upon an amplitude of one or more of the non-speech sounds. As such, for a dialogue recording having a total duration of 30 seconds, the second machine learning model can be trained to receive a portion of the audio data for the recording (e.g. 10 seconds) and output second classification data for the recording depending on one or more second properties for that portion of the audio data. In this way, a dialogue recording can be classified without having to receive and analyse all of the audio data. Alternatively, the second machine learning model can be trained to receive all of the audio data for a given dialogue recording and to output second classification data for the given dialogue recording depending one or more of the second properties. The second machine learning model can be trained to classify each of the sounds in the audio data by classifying each sound as either a speech sound or a non-speech sound and, on the basis of one or more properties of the non-speech sounds in the audio data (e.g. number of the sounds, duration of the sounds, amplitude of one or more of the sounds), the second machine learning model can output the second classification data indicative of one speech quality classification from a plurality of speech quality classifications for the dialogue recording. The second machine learning model can be trained to learn a relationship between a duration of the non-speech sounds in a dialogue recording and each of a plurality of speech quality classifications. Similarly, the second machine learning model can be trained to learn a relationship between a number of respective non-speech sounds in a dialogue recording and each of a plurality of speech quality classifications. Similarly, the second machine learning model can be trained to learn a relationship between an amplitude of one or more non-speech sounds in a dialogue recording and each of a plurality of speech quality classifications. For example, the second machine learning can learn a relationship between an average amplitude (preferably median amplitude rather than a mean amplitude to avoid problems associated with low level sounds) of the non-speech sounds in a dialogue recording and each of the plurality of speech quality classifications. Alternatively, rather than using an average amplitude of the non-speech sounds in a recording to classify the recording, the second machine learning model may instead be trained to learn a relationship between an amplitude of a loudest non-speech sound and each of the plurality of speech quality classifications.

The second machine learning model can be trained to output the second classification data indicating a speech quality classification from a plurality of speech quality classifications in dependence upon a number of respective words per unit time for the dialogue recording. The second machine learning model can be trained to classify each of the sounds in the audio data by classifying each sound as either a speech sound or a non-speech sound. On the basis of the speech sounds the second machine learning model can detect a number of respective words per unit time for the dialogue recording (or a number of respective syllables per unit time). The second machine learning model can thus be trained to output the second classification data indicative of one speech quality classification from a plurality of speech quality classifications for the dialogue recording in dependence upon a word rate for the dialogue recording. In particular, the second machine learning model can be trained to learn a relationship between a word rate of a dialogue recording and each of a plurality of speech quality classifications. This is particularly useful for a case in which the input circuitry 110 receives audio data for a plurality of recordings for a same scene or same in-game level. For a given in-game scene such as a battle scene, it is expected that if one character has a fast rate of speech then another character would also have a similar rate of speech. Similarly, for another in-game scene such as a scene in which in-game characters negotiate with each other or discuss tactics, it would be expected that the in-game characters would have a relatively slow rate of speech. During recording of dialogue for a video game, a game developer may not be onsite to direct an actor reading a script, such that the actor may decide that a given line should be recited in a different way to the game developer's intention, because the actor may not necessarily know the context of the scene or level. A user's enjoyment of a video game can be significantly affected when certain characters appear to speak in a manner that is not commensurate with the type of scene and this can detract from the user's immersion when playing a video game.

The second machine learning model can be trained to receive at least some of the audio data for each of a plurality of dialogue recordings for an in-game scene or level and output the second classification data for each of the dialogue recordings in dependence upon the word rate (or syllable rate) for the dialogue recording. In this way, the second classification data output by the machine learning model can distinguish between the dialogue recordings and one or more dialogue recording having a word rate that is much faster or much slower than the other dialogue recordings can be identified. For example, the second machine learning model can be trained to for a given video game or for a given in-game level or in-game scene to learn a relationship between a speech rate of a dialogue recording and each of the plurality of speech quality classifications. For example, for a given in-game level or scene in which the in-game characters have a high rate of speech (such as during an in-game battle or fight), the second machine learning model can be trained to output the second classification data indicating one of a first classification and a second classification for a dialogue recording, where the first classification is indicative of a high speech quality for the in-game level and the second classification is indicative of a low speech quality for the in-game level, where in the case of this type of level (or scene) high speech quality corresponds to a high speech rate and low speech quality corresponds to a low speech rate. In this way, one or more dialogue recordings having a slow speech rate can be distinguished from one or more dialogue recordings having a high speech rate and the storage circuitry 130 can be configured to store identification information for the dialogue recordings having the second classification. Therefore, the data processing apparatus 100 can assist a game developer in identifying one or more dialogue recordings that are not of sufficient quality for use in the video game because the speech rate is not suitable.

The second machine learning model can be trained to output the second classification data indicating a speech quality classification from a plurality of speech quality classifications in dependence upon a number of respective plosive sounds for the dialogue recording. The second machine learning model can be trained to classify each of the sounds in the audio data by classifying each non-speech sound as either a plosive sound or a non-plosive sound. One or more plosive sounds in a dialogue recording can be audible to a user as a popping sound or a wind sound. The second machine learning model can in some cases be trained to detect these types of sounds in a dialogue recording and to learn a relationship between a number of respective plosive sounds for a dialogue recording and each of the plurality of speech quality classifications. Similarly, in some cases the second machine learning model can be trained to detect the plosive sounds for a dialogue recording and to learn a relationship between an amplitude of one or more of the plosive sounds for the dialogue recording and each of the plurality of speech quality classifications. For example, the second machine learning can learn a relationship between an average amplitude of the plosive sounds in a dialogue recording and each of the plurality of speech quality classifications. Alternatively, rather than using an average amplitude of the plosive sounds in a dialogue recording to classify the dialogue recording, the second machine learning model may instead be trained to learn a relationship between an amplitude of a loudest plosive sound and each of the plurality of speech quality classifications. Therefore, a dialogue recording can be classified according to a number of respective plosive sounds and the storage circuitry 130 can be configured to store identification information for one or more dialogue recordings having a classification indicative of a speech quality level that is less than a threshold speech quality level so as to assist a game developer in identifying one or more dialogue recordings that are not of sufficient quality for use in the video game because of the number and/or loudness of the plosive sounds.

In embodiments of the disclosure, the storage circuitry 130 is configured to store the identification data for one or more of the plurality of dialogue recordings for which the second classification data is indicative of a speech quality classification having an speech quality level that is less than a threshold speech quality level for the second classification data. In a manner similar to the first classification data output by the first machine learning model, the second classification data is indicative of a classification from a plurality of classifications, where each of the speech quality classifications is associated with a speech quality level. The storage circuitry 130 can be configured to compare the second classification data for each dialogue recording with a threshold speech quality level and to store identification data for one or more dialogue recordings for which the second classification data is indicative of a speech quality level that is less than the threshold speech quality level. Therefore, the storage circuitry 130 can be configured to store information for identifying dialogue recordings not of sufficient speech quality for the video game. As such, a game developer can either be informed of dialogue recordings which need to be re-taken. Alternatively, in some examples, the data processing apparatus 100 may further comprise filtering circuitry (not shown in FIG. 2) to process the audio data for a dialogue recording using a low pass filter to remove some of the low frequencies associated with a plosive sound.

In embodiments of the disclosure, the storage circuitry 130 is configured to store the second classification data for a dialogue recording in association with the identification information for the dialogue recording. In this way, in addition to storing information for identifying the dialogue recording a game developer can also be informed of a speech quality classification for the dialogue recording. A game developer can thus be informed of a relative level of the speech quality of a dialogue recording so that dialogue recordings deemed to have the lowest quality speech classification can be preferentially targeted for improvement or replacement.

Figure 4:
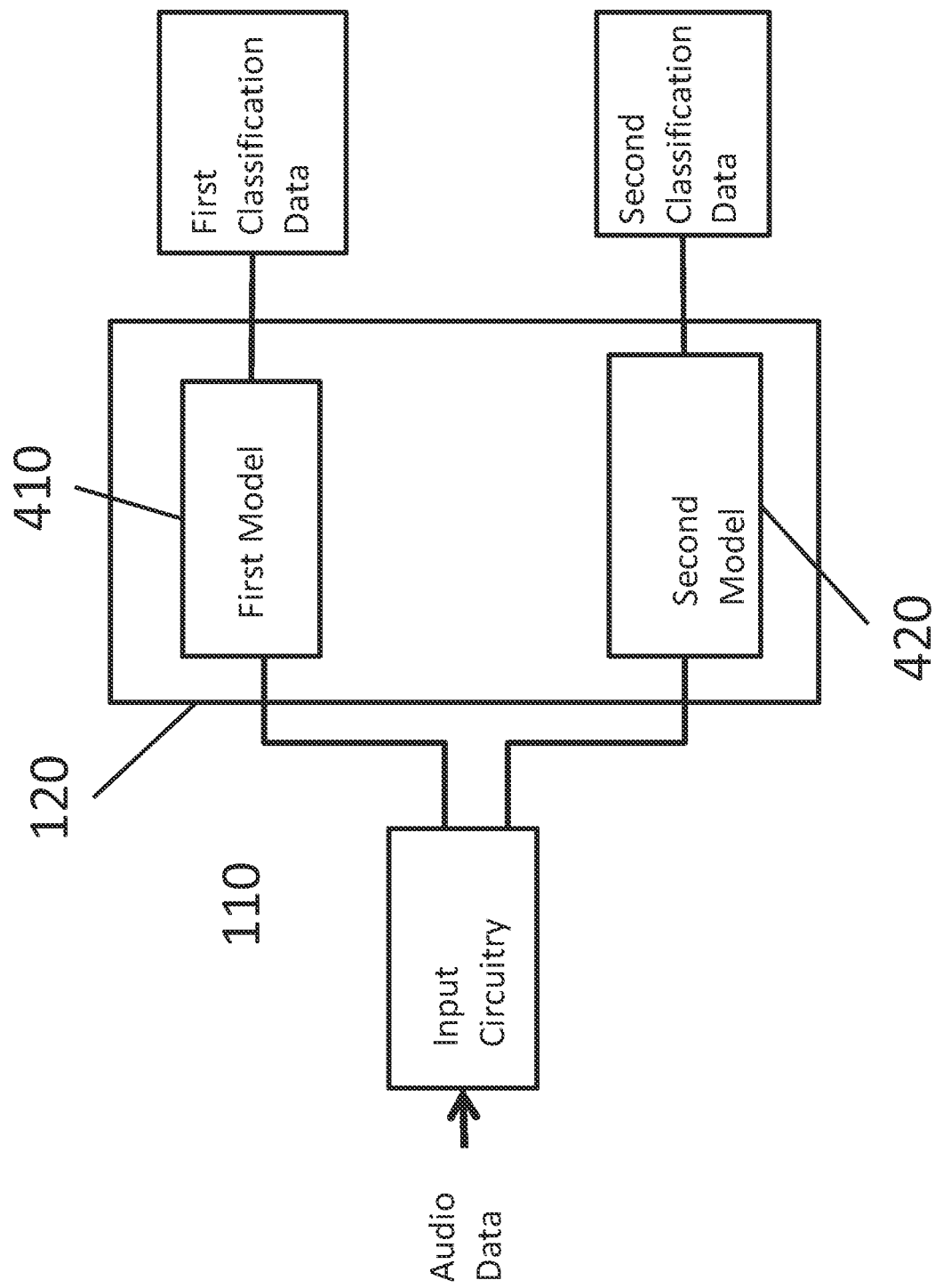
FIG. 4 is a schematic diagram illustrating first and second machine learning models for outputting first and second classification data.

In embodiments of the disclosure, the classification circuitry 120 comprises at least one of the first machine learning model and the second machine learning model. In some embodiments, the classification circuitry 120 comprises both the first machine learning model and the second machine learning model such that both the first classification data and the second classification data can be output for a given dialogue recording. FIG. 4 is a schematic diagram illustrating the data processing apparatus 100 comprising the first machine learning model 410 and the second machine learning model 420. The input circuitry 110 is configured to receive at least some of the audio data for a dialogue recording and the received audio data is provided to the first machine learning model 410 and the second machine learning model 420. As such, for a given dialogue recording the data processing apparatus 100 can be configured to output both the first classification data and the classification data for the given dialogue recording. Therefore, the storage circuitry 130 can be configured to store identification data for a dialogue recording according to in dependence upon whether at least one of the first classification data and the second classification data has a quality level that is less than the threshold quality level for that classification data. A first threshold quality level (threshold audio noise quality level) can be set for the first classification data and a second threshold quality level (threshold speech quality level) can be set for the second classification data. Therefore, the storage circuitry 130 can be configured to compare the first classification data with first threshold quality level and store identification data for the dialogue recording when the first classification data is indicative of a quality level that is less than the threshold quality level for the first classification data. Similarly, the storage circuitry 130 can be configured to compare the second classification data with second threshold quality level and store identification data for the dialogue recording when the second classification data is indicative of a quality level that is less than the threshold quality level for the second classification data. Therefore, provided that at least one of the first classification data and the second classification data indicates that the dialogue recording is not of sufficient quality then the storage circuitry 130 can store identification information for the dialogue recording. In the following, the expression "not of sufficient quality" refers to a dialogue recording for which at least one of the first classification data and the second classification data is indicative of a quality level that is less than the threshold quality level for the first classification data and the second classification data, respectively.

Therefore, in the case of a dialogue recording having first classification data indicating an audio noise quality level is not of sufficient quality (e.g. due to a large noise floor) and having second classification data indicating a speech quality level that is of sufficient quality, the storage circuitry can be configured to store identification information for the dialogue recording. Conversely, in the case of a dialogue recording having first classification data indicating an audio noise quality level is of sufficient quality and having second classification data indicating a speech quality level that is not of sufficient quality (e.g. due to a large number of plosive sounds), the storage circuitry can be configured to store identification information for the dialogue recording.

In addition to storing the identification information for a dialogue recording, the storage circuitry 130 can optionally be configured to store at least one of the first classification data and the second classification data in association with the identification information for a dialogue recording. The storage circuitry 130 can be configured to store the first classification data in association with the identification information for a dialogue recording depending on whether the first classification data is indicative of a classification having an audio noise quality level that is less than the threshold audio noise quality level. As such, when the first classification data for a dialogue recording is indicative of a classification having an audio noise quality level that is less than the threshold audio noise quality level, the storage circuitry 130 can store the first classification data for the dialogue recording in association with the identification information. Similarly, the storage circuitry 130 can be configured to store the second classification data in association with the identification information for a dialogue recording depending on whether the second classification data is indicative of a classification having a speech quality level that is less than the threshold speech quality level for the second classification data. Therefore, when the second classification data for a dialogue recording is indicative of a classification having a speech quality level that is less than the threshold speech quality level, the storage circuitry 130 can store the second classification data for the dialogue recording in association with the identification information.

In some examples, the storage circuitry 130 can be configured to store both the first classification data and the second classification data in association with the identification information for a dialogue recording when at least one of the first classification data and the second classification data indicates that the dialogue recording is not of sufficient quality.

In embodiments of the disclosure, the classification circuitry 120 is configured to generate text data in dependence upon the audio data for the dialogue recording and to output third classification data indicative of an accuracy classification for the dialogue recording in dependence upon a degree of match between the generated text data and a predetermined text file for the video game. The classification circuitry 120 can be configured to receive at least a portion of the audio data for a dialogue recording and generate text data including one or more words. The classification circuitry 120 can be configured to execute a speech-to-text program, such as Dragon® by Nuance, to convert at least a portion of the audio data into a textual representation including one or more words. The classification circuitry 120 can use any existing speech recognition system to generate the text data. The classification circuitry 120 is configured to output third classification data in dependence upon a degree of match between the text data and a predetermined text file stored for the video game, where the predetermined text file includes text data for a script for the video game. The predetermined text file may include text data for a given-in game level or a given in-game scene or may include text data for the whole video game. The classification circuitry 120 can be configured to compare the generated text data with the predetermined text file to identify a degree of match between the generated text data and the predetermined text file. In a simplest case, the classification circuitry 120 is configured to compare the sequence of words in the generated text data with the predetermined text file to identify a sequence of words in the predetermined text file having a highest degree of match. In this way, a portion of the predetermined text file having a highest degree of match can be firstly identified. Upon identifying the sequence of words in the predetermined text file having the highest degree of match, the classification circuitry 120 is configured to calculate a similarity score indicative of a degree of similarity between the generated text data and the predetermined text file. A similarity score may for example be calculated by comparing the sequence of words in the generated text data with the sequence of words in the predetermined text file having the highest degree of match and calculating a number of matching words. For example, in the case where each of the words in the generated text data match the words in the sequence of words in the predetermined text file then a similarity score of 1 can be calculated. Similarly, in the case of a dialogue recording for which the generated text data includes ten respective words, the classification circuitry 120 can be configured to calculate a similarity score of 0.8 in the case where eight of the ten words have a match in the sequence of words in the predetermined text file. Whilst the above example has been described with reference to a similarity score ranging between 0 and 1, it will be appreciated that the similarity score can take any suitable format for indicating the similarity between the generated text data and the predetermined text file on the basis of a number of matching words.

During recording of dialogue for video game, user-error may sometimes result in certain words in the video game script being mispronounced, missed or inaudible due to one or more masking sounds such as plosive sounds or background noise. The classification circuitry 120 can thus be configured to use speech-to-text to convert the audio data for a dialogue recording to a textual representation and compare the textual representation to a predetermined file including one or more scripted lines for the video game and output third classification data indicative of one classification from a plurality of classifications to classify the dialogue recording according to an accuracy of the dialogue recording with respect to the video game script. For example, the classification circuitry 120 can be configured to output the third classification data for a dialogue recording indicating one of a first classification and a second classification, where the first classification is a high quality classification (e.g. at least 95% degree of match) and the second classification is a low quality classification (e.g. less than 95% degree of match). The third classification data is indicative of one classification from a plurality of classifications where the number of classification is not particularly limited. In this way, the third classification data can be output for a dialogue recording to provide an indication of an accuracy of the speech in the dialogue recording As described above with reference to the first classification data and the second classification data, the storage circuitry 130 can also be configured to store identification data for a dialogue recording in dependence upon the third classification data. The storage circuitry 130 can store identification data for a dialogue recording depending on whether the third classification data for the dialogue recording is indicative of a classification having an associated speech accuracy that is less than a threshold speech accuracy for the third classification data. Therefore, the storage circuitry 130 can store identification information for one or more of the plurality of dialogue recordings received by the input circuitry 110 for which the third classification data indicates that the dialogue recording is not of sufficient quality for the video game.

In some examples, the classification circuitry 120 comprises a third machine learning model trained to generate the text data in dependence upon at least some of the audio data for the dialogue recording. The third machine learning model can be trained to convert speech-to-text using deep learning training techniques.

In embodiments of the disclosure, the classification circuitry 120 is configured to output at least one of the first classification data, the second classification data and the third classification data. The storage circuitry 130 can be configured to store one or more of the first classification data, the second classification data and the third classification data in association with the identification data for a dialogue recording. As explained previously, the storage circuitry 130 can be configured to store both the first classification data and the second classification data in association with the identification information for a dialogue recording when at least one of the first classification data and the second classification data indicates that the dialogue recording is not of sufficient quality. Similarly, the storage circuitry 130 can be configured to store each of the first classification data, the second classification data and the third classification data in association with the identification data for a dialogue recording when at least one of the first classification data, the second classification data and the third classification data indicates that the dialogue recording is not of sufficient quality. For example, in the case where the second classification data indicates that the dialogue recording is not of sufficient quality then the storage circuitry 130 can be configured to store each of the first, second and third classification data output for the dialogue recording. Alternatively, the storage circuitry 130 can be configured to store the first classification data when the first classification data indicates that the dialogue recording is not of sufficient quality, to store the second classification data when the second classification data indicates that the dialogue recording is not of sufficient quality, and to store the third classification data when the third classification data indicates that the dialogue recording is not of sufficient quality. For example, in the case where just the second classification data indicates that the dialogue recording is not of sufficient quality, then the storage circuitry 130 can be configured to store just the second classification data that is output for the dialogue recording.

In embodiments of the disclosure, one or more the machine learning models 125 includes one or more deep learning convolutional neural networks (CNN). In embodiments of the disclosure, the first machine learning model 410 includes a deep learning convolutional neural network trained using training data comprising labelled audio data so as to classify input audio data for a dialogue recording by outputting first classification data indicative of an audio noise quality classification. The training data includes respective instances of audio data where each instance is labelled with a classification. For example, in the case where the first machine learning model 410 is trained to classify input audio data using three respective classes (e.g. high quality, intermediate quality and low quality), the training data comprises: a plurality of instances of high quality audio each labelled as high quality; a plurality of instances of intermediate quality audio each labelled as intermediate quality; and a plurality of instances of low quality audio each labelled as low quality. Depending on which property of the audio data the first machine learning model 410 is to be trained for, the training data can be selected so as to include instances of audio data with varying quality levels for that property and appropriately labelled. Therefore, in one example the training data comprises a plurality of instances of audio data having varying magnitudes of the noise floor and each labelled with a quality classification according to the magnitude of the noise floor. As such, the first machine learning model 410 can be trained to learn a relationship between a magnitude of a noise floor duration in a dialogue recording and each of a plurality of audio noise quality classifications. In use, the first machine learning model 410 is trained to receive an input comprising audio data, to calculate a probability for each of the classifications for which the machine learning model is trained, and to output the first classification data to indicate the classification having the greatest probability. It will be appreciated that the first machine learning model 410 can be trained in a similar manner for any of the properties discussed previously. The first machine learning model 410 may comprise a plurality of deep learning convolutional neural networks (CNN), where each CNN is trained for one of the properties discussed previously with respect to the first machine learning model 420.

In embodiments of the disclosure, the second machine learning model 420 includes a deep learning convolutional neural network (CNN). The second machine learning model 420 can be trained in a manner similar to that described above with respect to the first machine learning model 410. Whereas the first machine learning model 410 is trained to classify input audio data according to audio noise quality, the second machine learning model 420 is trained to classify input audio data according to speech quality. Therefore, the training data used for training the second machine learning model 420 is instead labelled with a speech quality classification. Depending on which property of the audio data the second machine learning model 420 is to be trained for, the training data can be selected so as to include instances of audio data with varying speech quality levels for that property and appropriately labelled. For example, the training data may comprise a plurality of instances of audio data having varying numbers of respective non-speech sounds (or varying numbers of respective plosive sounds) and each instance of the audio data labelled with a speech quality classification according to the numbers of respective non-speech sounds. The second machine learning model 420 may comprise a plurality of deep learning convolutional neural networks (CNN), where each CNN is trained for one of the properties discussed previously with respect to the second machine learning model 420.

In embodiments of the disclosure, one or more of the first and second machine learning models includes a plurality of twin neural networks. The first machine learning model 410 and/or the second machine learning model 420 may include a plurality of twin neural networks (sometimes known as a Siamese neural network), where a twin neural network operates by learning a similarity function so as to receive two inputs and output a similarity score for the two inputs. A twin neural network includes two deep learning convolutional neural networks that are trained in the same way to have substantially the same loss functions. Therefore, a first input can be provided to one neural network and another input to the other neural network and the twin neural network can be trained to output a similarity score indicative of a similarity of the two inputs, such that on the basis of the similarity score it is possible to determine whether the two inputs correspond to a same classification. In some examples, the first machine learning model 410 may include a twin neural network in which the two neural networks have slightly different loss functions such that the two loss functions may not strictly be the same as each other.

In embodiments of the disclosure, the plurality of twin neural networks comprises a first twin neural network to receive the audio data for the dialogue recording and trained to output a first similarity score for a first quality classification and a second twin neural network to receive the audio data for the dialogue recording and trained to output a second similarity score for a second quality classification, and wherein the classification data is indicative of the first quality classification when the first similarity score is greater than the second similarity score.

In embodiments of the disclosure, the first machine learning model 410 comprises a twin neural network trained for each classification of the plurality of classifications for the first classification data. For a given input audio signal, the input audio signal can be provided to both a first twin neural network trained for a first classification (e.g. high quality) and a second twin neural network trained for a second classification (e.g. low quality). The first twin neural network therefore receives the input audio signal and outputs a similarity score indicative of a similarity between the input audio signal and a reference audio signal for the first classification. The second twin neural network also receives the input audio signal and outputs a similarity score indicative of a similarity between the input audio signal and a reference audio signal for the second classification. The first twin neural network uses a pre-selected instance of audio data representing an example (first reference audio data) of audio data having the first classification, whereas the second twin neural network uses a different pre-selected instance of audio data representing an example (second reference audio data) of audio data having the second classification. Therefore, the first twin neural network and the second twin neural network both output respective similarity scores and the input audio signal is classified as having either the first classification or the second classification according to which similarity score is the largest. Hence more generally, the first machine learning model 420 comprises a plurality of twin neural networks, where each twin neural network is trained for one quality classification of the plurality of quality classifications for the first classification data. Moreover, in the case where N classifications are used by the first classification data to classify an input audio signal, the first machine learning model 420 can comprise N respective twin neural networks, where each twin neural network is trained for a given quality class and the classification data output for a dialogue recording is indicative of the quality class associated with the twin neural network having the greatest value for the similarity score.

Twin neural networks can have applications in facial recognition in that two images (one of which is a reference image) can be provided as an input to a twin neural network and a similarity score is output indicating a similarity of the two images so as to determine whether the face in the image is the face of a registered user. One advantage of using a twin neural network is that the use of a large amount of labelled training data is not necessary.

Therefore, rather than requiring the use of labelled training data, the first machine learning model 410 can comprise a plurality of twin neural networks where each twin neural network is trained to output a similarity score for the classification for which that twin neural network is trained for according to a similarity between an input instance of audio data and a reference instance of audio data for that twin neural network. Therefore, in the case where N classification are used by the first classification data to classify an input audio signal, each of the N twin neural networks is provided with a same input audio signal and trained to output a similarity score and the first machine learning model 410 is configured to output the first classification data for the input audio signal indicative of the classification having the largest similarity score. Each of the twin neural networks can be trained for any of the properties discussed previously with reference to the first machine learning model 410. A first twin neural network trained for a first classification (e.g. high quality) may use a first reference instance of audio data having a first audio noise quality level for a given audio property and a second twin neural network trained for a second classification (e.g. low quality) may used a second reference instance of audio data having a second audio noise quality level for the given audio property. Depending on which property of the audio data the plurality of twin neural networks are to be trained for, the plurality of pre-selected reference instances are selected so as to include instances of audio data with varying quality levels for that property. Therefore, in one example a first pre-selected reference instance of audio data having a first magnitude of the noise floor is selected for the first twin neural network and a second pre-selected reference instance of audio data having a second magnitude of the noise floor is selected for the second twin neural network, where the first pre-selected reference instance of audio data is an example of audio data having high audio noise quality (or low audio noise quality) and the second pre-selected reference instance of audio data is an example of audio data having low audio noise quality (or high audio noise quality).

In some examples, the first machine learning model 410 comprises a plurality of first twin neural networks trained for a first property of an audio signal (e.g. magnitude of a noise floor) and a plurality of second twin neural networks trained for a second property of the audio signal (e.g. signal to noise ratio). As such, the first machine learning model 410 can be configured to output first classification data indicative of a classification for the input audio data according to the first property for which the first plurality of twin neural networks is trained and to output first classification data indicative of a classification for the input audio data according to the second property for which the second plurality of twin neural networks is trained.

In embodiments of the disclosure, the second machine learning model 420 comprises a twin neural network trained for each classification of the plurality of classifications for the second classification data. In the same way as described above with reference to the first machine learning model 410, the second machine learning model 420 may also comprise a plurality of twin neural networks such that the second machine learning model 420 outputs second classification data for the audio data for a dialogue recording by providing the same audio data as an input to each of a plurality of twin neural networks and outputting the second classification data to indicate the classification having the largest similarity score. As such, a first twin neural network uses a pre-selected first reference instance of audio data having a first speech quality level for a given audio property and a second twin neural network uses a pre-selected second reference instance of audio data having a second speech quality level for the given audio property. Depending on which property of the audio data the plurality of twin neural networks are to be trained for, the plurality of pre-selected reference instances are selected so as to include instances of audio data with varying speech quality levels for that property. For example, a first pre-selected reference instance of audio data having a first number of respective non-speech sounds can be selected for a first twin neural network and a second pre-selected reference instance of audio data having a second number of respective non-speech sounds can be selected for a second twin neural network. In some examples, the second machine learning model 420 comprises a plurality of first twin neural networks trained for a first property of an audio signal (e.g. duration of non-speech sounds for a dialogue recording) and a plurality of second twin neural networks trained for a second property of the audio signal (e.g. amplitude of one or more plosive sounds for a dialogue recording).

Figure 5:
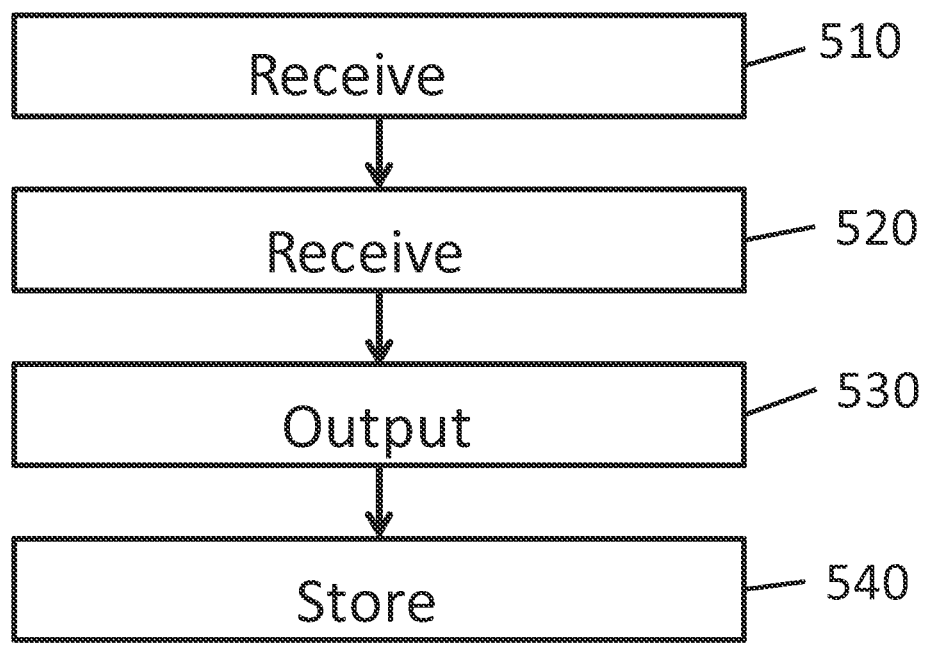
FIG. 5 is a schematic flowchart illustrating a data processing method.

Referring now to FIG. 5, in embodiments of the disclosure a data processing method comprises:
 receiving (at a step 510) audio data for a plurality of respective dialogue recordings for a video game;
 receiving (at a step 520), by one or more machine learning models, at least a portion of the audio data for each dialogue recording;
 outputting (at a step 530), by one or more of the machine learning models, classification data indicative of a quality classification of a dialogue recording in dependence upon one or more properties of the audio data for the dialogue recording; and storing (at a step 540) identification data for one or more of the plurality of dialogue recordings in dependence upon the classification data.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising:
   input circuitry to receive audio data for a plurality of respective dialogue recordings for a video game;
   classification circuitry comprising one or more machine learning models to receive at least a portion of the audio data for each dialogue recording and trained to output classification data indicative of a quality classification of a dialogue recording in dependence upon one or more properties of the audio data for the dialogue recording; and
   storage circuitry to store identification data for one or more of the plurality of dialogue recordings in dependence upon the classification data, wherein:
   the one or more machine learning models comprise a first machine learning model trained to output first classification data indicative of an audio noise quality classification of the dialogue recording in dependence upon one or more first properties of the audio data for the dialogue recording; and
   the storage circuitry is configured to store the identification data for one or more of the plurality of dialogue recordings for which the first classification data is indicative of an audio noise quality classification having an audio noise quality level that is less than a threshold audio noise quality level for the first classification data.

2. The data processing apparatus according to claim 1, wherein the one or more first properties of the audio data for the dialogue recording comprise one or more of:
   a magnitude of a noise floor for the dialogue recording; and
   a magnitude of a signal to noise ratio for the dialogue recording.

3. The data processing apparatus according to claim 1, wherein the one or more machine learning models comprise a second machine learning model trained to output second classification data indicative of a speech quality classification of the dialogue recording in dependence upon one or more second properties of the audio data for the dialogue recording.

4. The data processing apparatus according to claim 3, wherein the one or more second properties of the audio data for the dialogue recording comprise one or more of:
   a duration of non-speech sounds for the dialogue recording;
   a number of respective non-speech sounds for the dialogue recording;
   an amplitude of one or more non-speech sounds for the dialogue recording;
   a number of respective words per unit time for the dialogue recording;
   a number of respective plosive sounds for the dialogue recording; and
   an amplitude of one or more plosive sounds for the dialogue recording.

5. The data processing apparatus according to claim 3, wherein the storage circuitry is configured to store the identification data for one or more of the plurality of dialogue recordings for which the second classification data is indicative of a speech quality classification having a speech quality level that is less than a threshold speech quality level for the second classification data.

6. The data processing apparatus according to claim 1, wherein the classification circuitry is configured to generate text data in dependence upon the audio data for the dialogue recording and to output third classification data indicative of an accuracy classification for the dialogue recording in dependence upon a degree of match between the generated text data and a predetermined text file for the video game.

7. The data processing apparatus according to claim 1, wherein one or more of the machine learning models include one or more deep learning convolutional neural networks.

8. The data processing apparatus according to claim 1, wherein one or more of the machine learning models include a plurality of twin neural networks.

9. The data processing apparatus according to claim 8, wherein the plurality of twin neural networks comprises a first twin neural network to receive the audio data for the dialogue recording and trained to output a first similarity score for a first quality classification and a second twin neural network to receive the audio data for the dialogue recording and trained to output a second similarity score for a second quality classification, and wherein the classification data is indicative of the first quality classification when the first similarity score is greater than the second similarity score.

10. The data processing apparatus according to claim 1, wherein the plurality of dialogue recordings each correspond to a same scene or in-game level for the video game.

11. The data processing apparatus according to claim 1, wherein the classification data output for a dialogue recording is indicative of a quality classification from a plurality of quality classifications.

12. A data processing apparatus, comprising:
input circuitry to receive audio data for a plurality of respective dialogue recordings for a video game;
classification circuitry comprising one or more machine learning models to receive at least a portion of the audio data for each dialogue recording and trained to output classification data indicative of a quality classification of a dialogue recording in dependence upon one or more properties of the audio data for the dialogue recording; and
storage circuitry to store identification data for one or more of the plurality of dialogue recordings in dependence upon the classification data, wherein:
the one or more machine learning models comprise a second machine learning model trained to output second classification data indicative of a speech quality classification of the dialogue recording in dependence upon one or more second properties of the audio data for the dialogue recording, and
the storage circuitry is configured to store the identification data for one or more of the plurality of dialogue recordings for which the second classification data is indicative of a speech quality classification having a speech quality level that is less than a threshold speech quality level for the second classification data.

13. A data processing apparatus, comprising:
input circuitry to receive audio data for a plurality of respective dialogue recordings for a video game;
classification circuitry comprising one or more machine learning models to receive at least a portion of the audio data for each dialogue recording and trained to output classification data indicative of a quality classification of a dialogue recording in dependence upon one or more properties of the audio data for the dialogue recording; and
storage circuitry to store identification data for one or more of the plurality of dialogue recordings in dependence upon the classification data,
wherein the classification circuitry is configured to generate text data in dependence upon the audio data for the dialogue recording and to output third classification data indicative of an accuracy classification for the dialogue recording in dependence upon a degree of match between the generated text data and a predetermined text file for the video game.

* * * * *